(12) United States Patent
Kato

(10) Patent No.: US 12,140,207 B2
(45) Date of Patent: Nov. 12, 2024

(54) ROTATION SUPPORT STRUCTURE FOR ELECTRIC CYLINDER

(71) Applicant: AISIN CORPORATION, Aichi (JP)

(72) Inventor: Ken Kato, Kariya (JP)

(73) Assignee: AISIN CORPORATION, Aichi (JP)

( * ) Notice: Subject to any disclaimer, the term of this patent is extended or adjusted under 35 U.S.C. 154(b) by 75 days.

(21) Appl. No.: 18/180,603

(22) Filed: Mar. 8, 2023

(65) Prior Publication Data

US 2023/0287966 A1 Sep. 14, 2023

(30) Foreign Application Priority Data

Mar. 9, 2022 (JP) ................................ 2022-036266
Mar. 14, 2022 (JP) ................................ 2022-038984

(51) Int. Cl.
*F16H 25/20* (2006.01)

(52) U.S. Cl.
CPC ..... *F16H 25/20* (2013.01); *F16H 2025/2031* (2013.01); *F16H 2025/2075* (2013.01); *F16H 2025/2087* (2013.01)

(58) Field of Classification Search
CPC ............ F16H 25/20; F16H 2025/2031; F16H 2025/2075; F16H 2025/2087; F16H 2025/204

See application file for complete search history.

(56) References Cited

U.S. PATENT DOCUMENTS

| | | | |
|---|---|---|---|
| 4,579,012 A * | 4/1986 | Mabie ..................... | F16H 25/20 74/89.34 |
| 6,763,918 B1 * | 7/2004 | Kapaan ................... | F16D 65/18 188/71.9 |
| 2017/0130792 A1 | 5/2017 | Tandler et al. | |
| 2019/0017502 A1 * | 1/2019 | Ohm ....................... | F16H 25/20 |
| 2020/0240443 A1 | 7/2020 | Alili et al. | |

FOREIGN PATENT DOCUMENTS

JP 2017521324 A 8/2017
JP 2020536784 A 12/2020

* cited by examiner

*Primary Examiner* — Timothy Hannon
(74) *Attorney, Agent, or Firm* — BUCHANAN, INGERSOLL & ROONEY PC

(57) ABSTRACT

A rotation support structure for an electric cylinder includes a motor attached to a housing and including an output shaft; and a speed reduction mechanism connected to the output shaft. The speed reduction mechanism includes a gear unit including a first gear and a shaft support portion and has an outer member facing an inner surface of the housing and a ball, and an annular second gear fixed to the housing and meshing with the first gear, one side end portion of the outer member faces the inner surface of the housing or a spacer attached to the housing, and the other side end portion faces the second gear. A gap is formed between the outer member and the second gear, and between the outer member and at least either the housing or the spacer. A gap is formed between the outer member and the inner surface of the housing.

12 Claims, 2 Drawing Sheets

FIG. 2A
FIG. 2B
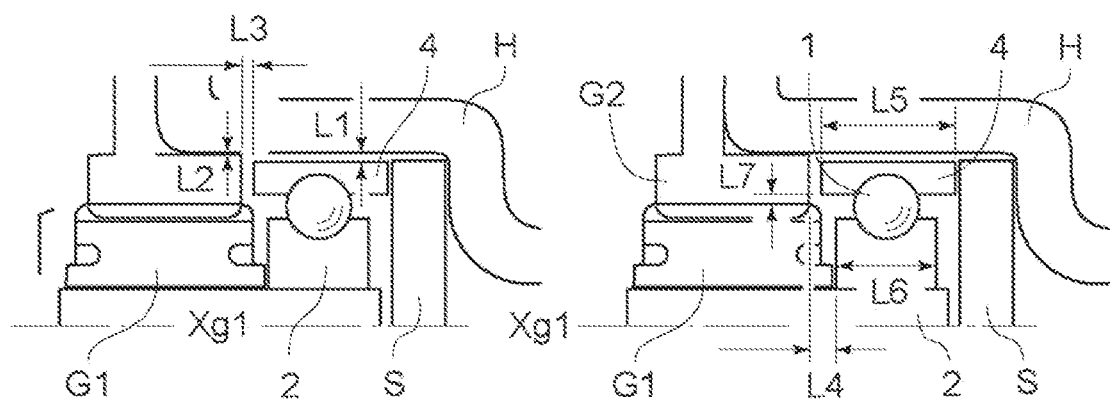
FIG. 3
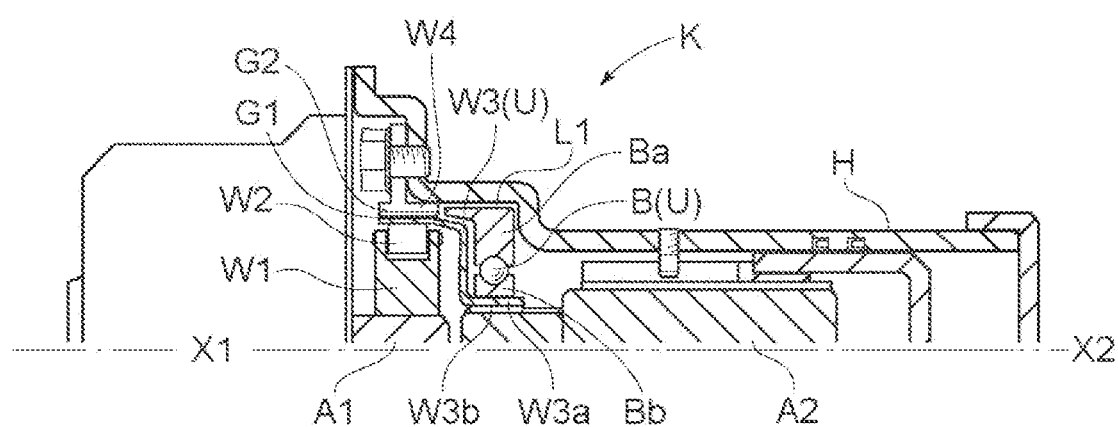

ROTATION SUPPORT STRUCTURE FOR ELECTRIC CYLINDER

CROSS REFERENCE TO RELATED APPLICATIONS

This application is based on and claims priority under 35 U.S.C. § 119 to Japanese Patent Applications 2022-36266, filed on Mar. 9, 2022, and 2022-38984, filed on Mar. 14, 2022, the entire content of which is incorporated herein by reference.

TECHNICAL FIELD

This disclosure relates to a rotation support structure for an electric cylinder in which, for example, a speed reduction mechanism is connected to an output shaft of a motor.

BACKGROUND DISCUSSION

In the related art, for example, JP 2020-536784A (Reference 1) discloses a rotation support structure (see paragraphs to and FIGS. 1 and 2).

The rotation support structure is a hydraulic module of an electrohydraulic servo brake, and supplies a hydraulic fluid to a brake by a piston driven by a motor.

In this rotation support structure, a pinion 511 serving as a sun gear is attached to a shaft 52 of a motor 5, and a plurality of planetary gears 512 mesh with the pinion 511. The plurality of planetary gears 512 are supported by a sleeve 62 that constitutes the piston, and this sleeve 62 serves as a so-called carrier. A ring gear (not shown) is disposed on an outer peripheral side of each planetary gear 512, and these planetary gear mechanisms are covered with a bottomed cylindrical hood 513. The sleeve 62 that functions as a carrier is held in a housing 7 via a bearing 72.

The piston 3 is reciprocally moved by the sleeve 62 along an inner wall of a cylinder 2 via balls 63 and a thread core 61. A ring 35 protruding radially outward is attached to an end of the piston 3, and a plurality of cuts 351 provided in the ring 35 moves along a needle 21 attached to the housing 7, thereby allowing the piston 3 to move reciprocally in a non-rotatable manner.

With such a configuration, the rotation support structure has a simple and highly reliable construction form for guiding the piston 3 and preventing the rotation of the piston 3 without increasing a required space.

In the above-described rotation support structure for an electric cylinder in the related art, an outer ring of the bearing 72 that pivotally supports a carrier (the sleeve 62) of the planetary gear 512 also serves as a wall portion of the housing 7. Therefore, an extending direction of a rotating shaft of the sleeve 62 serving as a carrier is accurately defined, and is substantially parallel to an extending direction of the housing 7.

On the other hand, the piston 3 is also reciprocally moved along the inner wall of the cylinder 2 integrated with the housing 7, and the thread core 61 integrated with the piston 3 is engaged with the sleeve 62 via the balls 63. In a ball screw structure, since no backlash exists between the screw thread core 61 and the sleeve 62 with the balls 63 interposed therebetween, an axial direction of the piston 3 also substantially coincides with an extending direction of the sleeve 62. Thus, accurate assembly of components from the planetary gear mechanism to the piston 3 without backlash is effective for accurately and maximally transmitting rotational drive from the motor to the piston 3.

However, when the hydraulic fluid is reliably supplied by the piston 3, excessive assembling accuracy between the components to the piston is not necessarily required. Even when a certain degree of play exists between the components, when a drive start timing of the motor is not strictly required, processing accuracy of the components such as each gear can be reduced. In this case, assembly work of a rotation support member is facilitated, and a rotation support member which is inexpensive as a whole can be obtained.

On the other hand, for example, even when processing accuracy of the planetary gear mechanism or the like is high, when the processing accuracy of the housing 7 is not accompanied, an attachment orientation of the planetary gear mechanism is not appropriate, and an unnecessary resistance may be generated in a reciprocating movement of the piston along the cylinder.

As described above, the rotation support structure in the related art has various problems to be solved. A need thus exists for a rotation support structure for an electric cylinder which is not susceptible to the drawback mentioned above.

In addition, in the above-described rotation support structure for an electric cylinder in the related art, a planetary gear mechanism includes the pinion 511 serving as a sun gear, the sleeve 62 serving as a carrier supporting the planetary gears 512 and a piston, and a ring gear fixed to the outer peripheral side of the planetary gears 512. The sleeve 62 constitutes a screw mechanism together with the thread core 61 and the balls 63, and the planetary gear mechanism and the screw mechanism are integrally formed.

However, since the sleeve 62 serving as a carrier of these components has a hollow structure, there is a limitation in a position at which a rotation shaft of the planetary gear 512 is attached. For this reason, a size of a member is increased, for example, the sleeve 62 needs to have a predetermined thickness. The bearing 72 and the ring gear integrally formed on an outer peripheral portion of the sleeve 62, which are disposed close to each other, easily come into contact with each other. To avoid this problem, it is necessary to bring a meshing diameter of the planetary gear 512 and the ring gear close to a PCD of the bearing 72, which also increases the size of the member because a shape of the member is restricted.

As described above, the rotation support structure in the related art has various problems to be solved. A need thus exists for a rotation support structure for an electric cylinder which is not susceptible to the drawback mentioned above.

SUMMARY

According to an aspect of this disclosure, a rotation support structure for an electric cylinder includes: a cylindrical housing; a motor attached to the housing and including an output shaft; and a speed reduction mechanism built in the housing and connected to the output shaft. The speed reduction mechanism includes: a gear unit including a first gear on one side that rotates in accordance with the output shaft, and a shaft support portion on the other side that rotates together with the first gear and has an outer member facing an inner surface of the housing and a ball mounted thereon; and an annular second gear fixed to the inner surface of the housing and meshing with the first gear. One side end portion of the outer member along an axis of the output shaft faces the inner surface of the housing or a spacer attached to the housing, and the other side end portion faces the second gear. A gap is formed between the outer member and the second gear, and between the outer member and at least either the housing or the spacer, and a gap is formed between the outer member and the inner surface of the housing.

According to another aspect of this disclosure, a rotation support structure for an electric cylinder includes: a cylindrical housing; a motor mounted on the housing and including an output shaft; and a speed reduction mechanism built in the housing and connected to the output shaft. The speed reduction mechanism includes: a gear unit including a first gear on one side that rotates in accordance with the output shaft, and a shaft support portion on the other side that rotates together with the first gear and has an outer member facing an inner surface of the housing and a ball mounted thereon; and an annular second gear fixed to the inner surface of the housing and meshing with the first gear. When viewed in a direction orthogonal to an axis of the output shaft, the second gear and the shaft support portion are disposed in a state of being spaced from each other in an extending direction of the axis, and when viewed in a direction along the axis, the outer member and the first gear are disposed in a state of being spaced from each other in a radial direction.

BRIEF DESCRIPTION OF THE DRAWINGS

The foregoing and additional features and characteristics of this disclosure will become more apparent from the following detailed description considered with the reference to the accompanying drawings, wherein:

FIG. 2A and FIG. 2B are views illustrating states of gaps provided in the rotation support structure according to the first embodiment; and FIG. 3 is a cross-sectional view showing a rotation support structure for an electric cylinder according to a second embodiment.

DETAILED DESCRIPTION

First Embodiment

Outline

Figure 1:
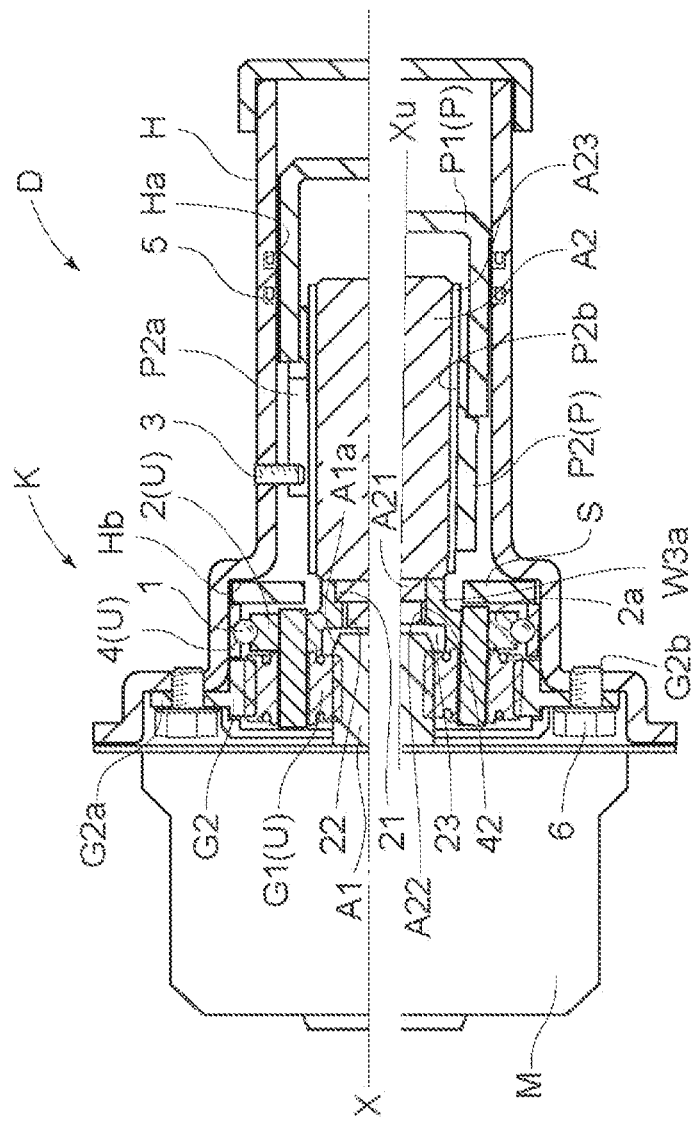
FIG. 1 is a cross-sectional view showing a rotation support structure for an electric cylinder according to a first embodiment.

In a rotation support structure for an electric cylinder D disclosed here, a rotational driving force from the motor M is transmitted to another driving target by a speed reduction mechanism K including a shaft support portion 2 using balls 1, and at the time of the transmission, the speed reduction mechanism K is capable of changing an orientation thereof with respect to a housing H.
Speed Reduction Mechanism A specific configuration of the rotation support structure according to a first embodiment is shown in, for example, FIGS. 1, 2A and 2B. Here, the speed reduction mechanism K is installed inside the cylindrical housing H, and a piston P, which is a driving target, is disposed at one side of the speed reduction mechanism K and at a back portion of the housing H. A motor M is connected to the other side of the speed reduction mechanism K so as to cover the speed reduction mechanism K.

Rotation of the motor M is transmitted from an output shaft A1 of the motor M to the speed reduction mechanism K, and is transmitted, after a rotation speed of the motor M is greatly reduced, to the piston P via a second output shaft A2 that protrudes toward a back side of the speed reduction mechanism K. The piston P includes, for example, a base portion P2 on a motor M side and the head portion P1 on a distal end side that are connected by screwing or fitting. An outer diameter of the base portion P2 is slightly smaller than an outer diameter of the head portion P1.

The piston P slides along an inner surface of the housing H. A male screw portion A23 is formed on an outer surface of the second output shaft A2, and is screwed to a female screw portion P2b formed on an inner surface of the base portion P2 of the piston P. Further, a guide groove P2a is formed on an outer surface of the base portion P2 such that the piston P is moved in a thrust manner along the inner surface of the housing H, and a convex portion 3 engaged with the guide groove P2a protrudes from a wall surface of the housing H. The convex portion 3 can be formed, for example, by screwing a screw member from an outside of the wall surface of the housing H.

The speed reduction mechanism K is implemented by, for example, a planetary gear mechanism. As shown in FIG. 1, a first gear G1 serving as a planetary gear meshes with the output shaft A1 of the motor M serving as a sun gear, and a plurality of the first gears G1 are held by the shaft support portion 2 serving as a carrier. An annular groove 2a that receives the balls 1 constituting the bearing is formed along a circumferential direction in an outer peripheral portion of the shaft support portion 2. An outer member 4 serving as an outer receiving portion of the bearing is disposed on an outer peripheral side of the shaft support portion 2 with the balls 1 interposed between the outer member 4 and the shaft support portion 2.

The first gear G1, the shaft support portion 2, the balls 1, and the outer member 4 are assembled into a gear unit U in advance. In this way, since the shaft support portion 2 of the planetary gear mechanism and the outer member 4 of the bearing are integrally formed, the rotation support structure is simplified as compared with a structure in which an independent ball bearing is mounted on the shaft support portion 2. Therefore, it is possible to reduce the number of components of the electric cylinder D, make the electric cylinder D compact, and improve mountability to various devices.

The gear unit U is inserted into the housing H together with the second output shaft A2 and the piston P. A boss portion 2b protruding toward the piston P is formed at the center of the shaft support portion 2. A fitting hole portion 21 and a serration hole portion 22 that are provided in two stages are formed inside the boss portion 2b. At an end of the second output shaft A2, a fitting convex portion A21 and a serration convex portion A22 are formed in two stages, and the second output shaft A2 and the shaft support portion 2 are fitted and connected to each other so that the second output shaft A2 and the shaft support portion 2 rotate integrally at all times.

Fitting connection between the second output shaft A2 and the shaft support portion 2 is achieved by simply fitting the end of the second output shaft A2 into the shaft support portion 2, but a pressing force directed toward the shaft support portion 2 acts on the second output shaft A2 via the piston P. Therefore, even when a simple fitting connection is used, the second output shaft A2 can be appropriately fixed to the shaft support portion 2.

A seal ring 5 made of a rubber member or the like is mounted between an outer peripheral surface of a head portion P1 and the inner surface of the housing H. In FIG. 1, the seal ring 5 is fitted in a ring groove Ha formed on the inner surface of the housing H. The arrangement may be exchanged, the seal ring 5 may be fitted in the ring groove Ha provided on the outer peripheral surface of the head portion P1.

When the second output shaft A2 is to be fitted to the shaft support portion 2, as shown in FIG. 1, a spacer S made of an annular plate is inserted between the shaft support portion 2 and the second output shaft A2 in advance. One surface of the spacer S faces a stepped portion Hb of the housing H, and the other surface faces the outer member 4. By using the spacer S, a position of the gear unit U along a direction of an axis X with respect to the housing H is accurately set. However, as will be described later, the spacer S is not completely fixed between the outer member 4 and the housing H, but can be moved slightly.

The spacer S may be omitted. For example, when a surface shape of the stepped portion Hb of the housing H is adjusted to such an extent that the outer member 4 can be in contact with the stepped portion Hb in an appropriate orientation without backlash, or when the position of the gear unit U along the direction of the axis X can be accurately set while the gear unit U is in contact with the stepped portion Hb, the spacer S may be omitted.

Attachment Structure of Second Gear

After the gear unit U is inserted into the housing H, the second gear G2 is attached. An internal tooth portion of the second gear G2 is inserted into the housing H while meshing with the plurality of first gears G1. An outer surface of the second gear G2 is a cylindrical surface, and is shaped so as to be in contact with or extremely close to the inner surface of the housing H without backlash when the second gear G2 rotates relative to the first gear G1.

A flange portion G2a protruding in the radial direction is provided in a vicinity of an end of the second gear G2 on a side opposite to the piston P. The flange portion G2a is provided with fixing holes G2b at a plurality of positions, and the second gear G2 is fixed to the housing H using a fixing member 6 such as a bolt.

In general, a gear member that is incorporated in the motor M or the like and transmits the driving force tends to be made of a material different from that of a structural member in consideration of durability and strength. Therefore, various kinds of gear members are often configured as single components each having only a gear function. However, in the present configuration, the annular second gear G2 is provided with the flange portion G2a, and has a function of fixing the second gear G2 in addition to a function of transmitting the driving force of the second gear G2. Such a second gear G2 is inserted subsequently into the gear unit U through an opening on one side of the housing H.

Accordingly, it is not necessary to prepare a special separate fixing component in addition to the second gear G2, attachment work of the gear unit U and the second gear G2 is facilitated, and a configuration of the electric cylinder D is simplified. In particular, since the flange portion G2a is positioned on an outer side of the internal tooth portion along a radial direction, when the second gear G2 is to be rotated by a reaction force of the rotational driving force that acts on the second gear G2 from the first gear G1, a length of a moment arm from the axis X to the flange portion G2a is increased. Therefore, attachment strength of the fixing member 6 for fixing the flange portion G2a to the housing H can be reduced.

In order to fix the second gear G2 to the housing H on the outer side of the internal tooth portion, even when processing accuracy of the fixing hole G2b or the like is low and the second gear G2 rotates with respect to the housing H, a backlash amount of the second gear G2 is reduced by an amount corresponding to a long distance from the axis X.

Attachment Structure of Motor

The motor M is attached to the housing H after the attachment of the second gear G2. The motor M is provided with the output shaft A1, which is attached while being engaged with the first gear G1 of the gear unit U already attached. In order to rationally transmit the driving force, it is preferable that backlash or the like does not occur between the output shaft A1 and the first gear G1. Therefore, a play between the output shaft A1 and the first gear G1 is set to be small, and the distal end of the output shaft A1 easily interferes with an end of the first gear G1 when the motor M is attached. In order to avoid this interference, an inclined portion A1a processed into a tapered shape is provided at the distal end of the output shaft A1. Due to the inclined portion A1a, the distal end of the output shaft A1 is easily engaged with a center position of the plurality of first gears G1, and attachment work of the motor M is facilitated.

If the inclined portion A1a meshes with the first gear G1, the engagement therebetween is reduced. Therefore, the inclined portion A1a passes through the first gear G1 and protrudes to a side of the shaft support portion 2. In order to cope with this protrusion, a recessed portion 23 is formed in a portion of the shaft support portion 2 that faces the distal end of the output shaft A1. By surrounding the inclined portion A1a by the recessed portion 23, an influence of an increase in a length of the output shaft A1 due to the formation of the inclined portion A1a is absorbed without reducing a meshing length between the output shaft A1 and the first gear G1, and the rotation support structure is kept compact.

Change in Orientation of Gear Unit

In the rotation support structure according to the present embodiment, a predetermined orientation of the gear unit U with respect to the housing H can be changed. That is, as shown in a lower part of FIG. 1, a deviation of a predetermined angle is allowed between an axis Xu of the gear unit U and the axis X of the motor M. According to the present configuration, for example, when the piston P is reciprocally moved, the electric cylinder D can be smoothly driven even if an error of a member dimension, an assembly error, or the like exists in the speed reduction mechanism K or the piston P.

When the piston P is reciprocally moved, a certain degree of axial vibration may occur in the piston P. Even in this case, since the piston P is reciprocally moved while being in close contact with the housing H, a predetermined gap is provided between the inner surface of the housing H and the piston P, and the seal ring 5 is provided therebetween to maintain a close contact state.

In this configuration, when the second output shaft A2 is influenced by a change in orientation of the piston P and rotates with an axial vibration, the gear unit U to which the second output shaft A2 is fitted and connected may be influenced, and rotational driving of the gear unit U may be not smoothly maintained. However, in the present configuration, a gap is positively provided between the gear unit U and the housing H to allow an axial vibration of the gear unit U, so that the electric cylinder D can be operated smoothly.

Gaps in Radial Direction

In the present embodiment, in particular, a gap L1 is positively provided between the outer surface of the outer member 4 and the inner surface of the housing H. Specifically, as shown in FIG. 2A, a portion of the inner surface of the housing H that faces the outer surface of the outer member 4 and the outer surface of the second gear G2 is a cylindrical surface, and an outer diameter of the outer surface of the outer member 4 is smaller than an outer diameter of the outer surface of the second gear G2. Accordingly, the gap L1 between the cylindrical surface and the outer member 4 is necessarily larger than a gap L2 between the cylindrical surface and the second gear G2.

By forming the gaps, as shown in the lower part of FIG. 1, the gear unit U and the piston P are swingable about a position in a vicinity of an engagement portion between the first gear G1 and the second gear G2. A space between the piston P and the inner surface of the housing H is sealed by the seal ring 5, so that an outer surface of the piston P and the inner surface of the housing H are not in direct contact with each other. Therefore, as described above, the gear unit U and the piston P are fully swingable.

The gap L1 between the outer member 4 and the inner surface of the housing H is, for example, about 80 μm. Here, a gap size in a case where an outer ring of a bearing is inserted and disposed in a bearing portion without rattling in a general mechanical structure is about 5 μm to 10 μm.

Accordingly, even when a shape error of the second gear G2 or the gear unit U, or a shape error or an attachment error of other objects such as the spacer S that are further connected to the gear unit U exists, the gear unit U can be accommodated in the housing H while absorbing these various errors. When the gear unit U and the piston P are driven, any members do not interfere with each other at a predetermined rotation angle, and occurrence of a load fluctuation caused by the rotation of the motor M can be prevented. Furthermore, since the outer member 4 that exhibits a bearing function is not completely fixed, it is possible to reduce work of fixing the outer member 4, which is necessary in the related art, to the housing H, and the like. For example, a welding step and the like can be eliminated, and occurrence of thermal strain due to welding or the like can be prevented.

Gap in Direction Along Axis

In the present embodiment, the outer member 4 is movable along the axis X by a predetermined distance. Therefore, a gap L3 is positively formed between the outer member 4 and the second gear G2, between the outer member 4 and the spacer S, or between the spacer S and the housing H. Specifically, the outer member 4 is movable along the axis X by about 300 μm to 400 μm. Accordingly, a change in orientation of the gear unit U and a change in orientation of the piston P become easier.

Gap Formation Structure Between Members

In the rotation support structure according to the present embodiment, members constituting the gear unit U and the second gear G2 do not interfere with each other even when the gear unit U is changed in orientation. Specifically, interference with the outer member 4 or the second gear G2, which rotates relative to the shaft support portion 2 and the first gear G1 which rotate integrally, is prevented.

Specifically, as shown in FIG. 2B, first, interference between the shaft support portion 2 and the second gear G2 is prevented. When viewed in a direction orthogonal to an axis Xg1 of the first gear G1, the second gear G2 and the shaft support portion 2 are disposed in a state of being spaced from each other in an extending direction of the axis X. That is, in FIG. 2B, a right end surface of the second gear G2 and a left end surface of the shaft support portion 2 have a gap L4 along a direction of the axis Xg1. The gap L4 is mainly formed by a distance at which an end surface of the outer member 4 that faces the second gear G2 is retracted from an end surface of the shaft support portion 2 that faces the first gear G1.

Accordingly, even when the shaft support portion 2 is displaced toward the second gear G2, the outer member 4 comes into contact with the second gear G2, and the shaft support portion 2 maintains a predetermined relative position with the outer member 4 via the ball 1, so that the left end surface of the shaft support portion 2 is necessarily positioned away from the second gear G2 with respect to the end surface of the outer member 4. As a result, the second gear G2 and the shaft support portion 2 do not interfere with each other at all times.

With respect to the shaft support portion 2, there is a concern that the rotating shaft support portion 2 may come into contact with the spacer S. However, in FIG. 2B, a right end portion of the shaft support portion 2 that faces the spacer S is configured to be retracted toward the first gear G1 with respect to an end surface of the outer member 4 that faces the spacer S. That is, a length L6 of an outer peripheral surface of the shaft support portion 2 is configured to be smaller than a length L5 of the outer member 4 along the axis Xg1, and both end surfaces of the shaft support portion 2 are retracted with respect to both end surfaces of the outer member 4. Accordingly, the shaft support portion 2 does not interfere with the spacer S.

Further, as shown in FIG. 2B, in order to prevent interference between the first gear G1 and the outer member 4, an inner diameter of the outer member 4 is configured to be larger than an outer diameter of the first gear G1, and a gap L7 is provided between the first gear G1 and the outer member 4. According to the present configuration, the outer member 4 and the first gear G1 do not have an overlapping portion when viewed along the axis Xg1. Therefore, even when the ball 1 between the shaft support portion 2 and the outer member 4 has backlash, and the first gear G1 moves toward the outer member 4 along the direction of the axis Xg1 with respect to the outer member 4, the first gear G1 and the outer member 4 do not interfere with each other.

As described above, according to the present configuration, in order to avoid interference between members that rotate relative to each other, for example, it is not necessary to accurately position a position of the meshing diameter between the first gear G1 and the second gear G2 and a pitch circle diameter (PCD) of a portion exhibiting a bearing function, that is, a radial position of the ball 1, and an allowable range of a member dimension or an installation position to be taken into consideration is significantly widened. Therefore, interference between rotating members is less likely to occur, and a highly reliable rotation support member can be obtained.

As described above, according to the present configuration, it is possible to obtain a rotation support structure for the electric cylinder D that appropriately outputs an output of the motor M while simplifying configurations of the gear unit U and the piston P.

Second Embodiment

As shown in FIG. 3, a differential gear mechanism may be used as the speed reduction mechanism K. A wave generator W1 meshes with the output shaft A1, and a pressing roller W2 provided at a distal end of the wave generator W1 presses external teeth of a flex spline W3 in a radially outward direction. The external teeth mesh with a circular spline W4 disposed outside the external teeth. A boss portion W3a is formed at an end of the flex spline W3 on a side opposite to the external teeth, and is pivotally supported by the housing H by a bearing B externally fitted to the boss portion W3a. The second output shaft A2 similar to that in the first embodiment is fitted to a fitting hole W3b at the center of the boss portion W3a. A serration or the like is provided in the fitting hole W3b such that the boss portion W3a and the second output shaft A2 rotate integrally.

In this case, the wave generator W1 is included in the output shaft A1, and the external teeth of the flex spline W3 correspond to the first gear G1. The circular spline W4 corresponds to the second gear G2. The bearing B of the boss portion W3a corresponds to the shaft support portion 2 on which the outer member 4 and the ball 1 in the first embodiment are mounted. That is, the flex spline W3 and the bearing B constitute the gear unit U.

In the present embodiment, for an outer ring of the bearing B, a predetermined gap L1 is positively provided between both end surfaces along the direction of the axis X and a side surface of the housing H or the circular spline W4, or between the outer ring Ba of the bearing B and the inner surface of the housing H, or between an inner ring Bb of the bearing B and the boss portion W3a of the flex spline W3.

The flex spline W3 is originally capable of being elastically deformed, and there is a possibility that different axes are formed in each part. For example, the axis X1 formed by a region of the external teeth whose position is restricted by the meshing between the flex spline W3 and the circular spline W4 may be non-parallel to the axis X2 formed by a region of the boss portion W3a at an opposite end. Therefore, even when the bearing B pivotally supporting the boss portion W3a is fixed to the housing H without backlash, it is possible to cope with a rotation failure caused by a dimensional error of a component or the like.

However, as in the present embodiment, a rotational state of the flex spline W3 can be made smoother by positively changing an orientation of the bearing B pivotally supporting the boss portion W3a.

Other Embodiments

In the above embodiments, the gap L1 is provided between the outer member 4 and the inner surface of the housing H, but in other configurations, for example, a predetermined gap may be provided between the ball 1 and the outer member 4. In this case, the outer member 4 and the inner surface of the housing H may be fixed by welding, the outer member 4 may be screwed and fixed to the inner surface of the housing H, or may be fixed by bolts.

The rotation support structure for an electric cylinder disclosed here can be widely used as a device that transmits the rotational driving force to another driving target while greatly reducing the rotational speed of the motor.

Characteristic Configuration

According to an aspect of this disclosure, a rotation support structure for an electric cylinder includes: a cylindrical housing; a motor attached to the housing and including an output shaft; and a speed reduction mechanism built in the housing and connected to the output shaft. The speed reduction mechanism includes: a gear unit including a first gear on one side that rotates in accordance with the output shaft, and a shaft support portion on the other side that rotates together with the first gear and has an outer member facing an inner surface of the housing and a ball mounted thereon; and an annular second gear fixed to the inner surface of the housing and meshing with the first gear. One side end portion of the outer member along an axis of the output shaft faces the inner surface of the housing or a spacer attached to the housing, and the other side end portion faces the second gear. A gap is formed between the outer member and the second gear, and between the outer member and at least either the housing or the spacer, and a gap is formed between the outer member and the inner surface of the housing.

Effects

In a general electric cylinder, a bearing that supports a rotating body such as a gear is mounted on a housing without a gap in order to prevent rotational runout of the gear or the like. However, in the present configuration, the gear unit can change an orientation thereof over a predetermined range inside the housing.

Accordingly, even when a shape error of the second gear or the gear unit, or a shape error or an attachment error of other objects that are further connected to the gear unit exists, the gear unit can be accommodated in the housing while absorbing these various errors. Therefore, it is possible to prevent occurrence of a load fluctuation caused by rotation of the electric cylinder, and to obtain an electric cylinder capable of stable operation.

Since the gear unit also functions as the bearing, it is possible to reduce the number of components of the electric cylinder. Therefore, it is possible to make the electric cylinder compact and improve the mountability to various devices.

Characteristic Configuration

In the rotation support structure for an electric cylinder disclosed here, the gear unit and the second gear may be inserted into the housing in order from an opening on one side of the housing, and the second gear may be fixed to the housing by a flange portion protruding radially outward from an outer peripheral portion of the second gear.

Effects

In the gear unit of the present configuration, since the shaft support portion has a ball bearing function and is integrated with the first gear, the rotation support structure is simplified as compared with a gear unit having an independent ball bearing. In addition, to assemble the electric cylinder in the present configuration, the gear unit and the second gear are inserted from the one side of the housing, and the second gear is fixed to the housing by using an integral flange portion protruding radially outward.

Normally, a gear member that is incorporated in a motor or the like and transmits a driving force tends to be made of a material different from that of a structural member in consideration of durability and strength. Therefore, various kinds of gear members are often configured as single components each having only a gear function. However, in the present configuration, the annular second gear is provided with the flange portion, and has a function of fixing the second gear in addition to a function of transmitting the driving force of the second gear.

Accordingly, it is not necessary to prepare a fixing member related to the second gear, attachment work of the second gear is facilitated, and a configuration of the electric cylinder is simplified. In particular, since the flange portion is positioned on an outer side of a gear portion along a radial direction, when the second gear attempts to rotate by a reaction force of a rotational driving force that acts on the second gear from the first gear, a length of a moment arm for generating a reaction force at the flange portion is increased. Therefore, attachment strength of a member for fixing the flange portion to the housing can be reduced.

In order to fix the second gear to the housing on the outer side of the gear portion, even when the processing accuracy of an attaching portion of the flange portion is low and the second gear rotates with respect to the housing, a backlash amount of the second gear is reduced by an amount corresponding to a long distance from a center of rotation.
Characteristic Configuration In the rotation support structure for an electric cylinder disclosed here, a portion of the inner surface of the housing that faces an outer surface of the outer member and an outer surface of the second gear may be a cylindrical surface, and the outer surface of the outer member may have an outer diameter smaller than an outer diameter of the outer surface of the second gear.

Effects

Both the second gear and the outer member face a cylindrical surface, which is the inner surface of the housing. At this time, if an outer diameter of the outer surface of the outer member is configured to be smaller than an outer diameter of the outer surface of the second gear, a gap between the cylindrical surface and the outer member is necessarily increased. Therefore, a structure in which the gear unit is installed with the gap provided with respect to the housing is easily formed.

If the inner surface of the housing is simply a cylindrical surface as in the present configuration, when the gear unit and the second gear are inserted into the housing, the gear unit and the second gear are not caught, and insertion work is facilitated.

In the rotation support structure for an electric cylinder disclosed here, a second output shaft may be fitted and connected to an end of the gear unit, and a piston that is reciprocally moved along the axis while being in close contact with the inner surface of the housing may be screwed to the second output shaft.

Effects

In the present configuration, the second output shaft is fitted and connected to an end of the gear unit, and the piston is screwed to the second output shaft. Fitting connection of the second output shaft is achieved by simply fitting the end of the second output shaft into the gear unit, but a pressing force directed toward the gear unit acts on the second output shaft via the piston. Therefore, even when a simple fitting connection is used, the second output shaft can be appropriately fixed to the gear unit.

On the other hand, when the piston is reciprocally moved, a certain degree of axial vibration occurs in the piston. A gap is required between the inner surface of the housing and the piston such that the piston is reciprocally moved while being in close contact with the housing. In addition, a seal ring or the like is provided between the piston and the housing to maintain a tight contact state.

Therefore, the second output shaft also rotates with an axial vibration due to an influence of the piston, which also influences the gear unit to which the second output shaft is fitted and connected. However, in the present configuration, a gap is positively provided between the gear unit and the housing to allow an axial vibration of the gear unit, so that the piston can be operated smoothly.
Characteristic Configuration According to another aspect of this disclosure, a rotation support structure for an electric cylinder includes: a cylindrical housing; a motor mounted on the housing and including an output shaft; and a speed reduction mechanism built in the housing and connected to the output shaft. The speed reduction mechanism includes: a gear unit including a first gear on one side that rotates in accordance with the output shaft, and a shaft support portion on the other side that rotates together with the first gear and has an outer member facing an inner surface of the housing and a ball mounted thereon; and an annular second gear fixed to the inner surface of the housing and meshing with the first gear. When viewed in a direction orthogonal to an axis of the output shaft, the second gear and the shaft support portion are disposed in a state of being spaced from each other in an extending direction of the axis, and when viewed in a direction along the axis, the outer member and the first gear are disposed in a state of being spaced from each other in a radial direction.

Effects

In the rotation support structure for an electric cylinder disclosed here, the speed reduction mechanism is provided, and a plurality of members constituting the speed reduction mechanism relatively rotate inside the housing. Therefore, it is necessary to reliably prevent mutual interference between the members.

Therefore, in the present configuration, an arrangement state of a rotating member and the fixing member arranged in a vicinity thereof is limited. Specifically, an installation state is defined for the first gear and the shaft support portion that rotate integrally.

An installation state between the first gear and the outer member in an adjacent area along the axis of the output shaft is defined. It is defined that a radial dimension of the shaft support portion is different from that of the second gear. Accordingly, even when the first gear and the shaft support portion move along the axis due to an assembly error, position movement during driving by the motor, or the like, mutual interference between the members can be reliably prevented.

Furthermore, according to the present configuration, it is not necessary to match the meshing diameter of the first gear and the second gear with a pitch circle diameter (PCD) of the bearing to prevent interference between the members.
Characteristic Configuration In the rotation support structure for an electric cylinder disclosed here, with respect to the shaft support portion and the outer member that face each other with the ball interposed therebetween, a length of the shaft support portion along the extending direction of the axis may be shorter than a length of the outer member, and a side surface of the shaft support portion that faces the second gear may be farther spaced from the second gear than a side surface of the outer member that faces the second gear.

Effects

In this configuration, it is defined that a length of the shaft support portion along the axis of the output shaft is shorter than a length of the outer member in the same direction, and a side surface of the shaft support portion is farther spaced from the second gear than the side surface of the outer member. Since a positional relation between the side surface of the shaft support portion and the side surface of the outer member can be reliably and easily defined by interposing the ball between the shaft support portion and the outer member, it is possible to reliably prevent interference between the shaft support portion, which is the rotating member, and the second gear, which is the fixing member.

Characteristic Configuration

In the rotation support structure for an electric cylinder disclosed here, advantageously, the gear unit is a planetary gear mechanism, the first gear is a planetary gear, the shaft support portion is a carrier that supports a plurality of the planetary gears, the output shaft is a sun gear, a tapered inclined portion is provided at a distal end of the output shaft, and a recessed portion that accommodates the inclined portion is provided at a position of the shaft support portion where the shaft support portion faces the output shaft.

Effects

According to the present configuration, when the gear unit is the planetary gear mechanism, the rotation support structure for an electric cylinder is made compact.

That is, when the output shaft of the motor is a sun gear and the first gear is a planetary gear, the motor may be mounted after the gear unit including the first gear and the like is mounted on the housing. At this time, the output shaft, which is a sun gear protruding from the motor, is inserted into a predetermined position of the first gear, which is a planetary gear. In order to rationally transmit the driving force, it is preferable that backlash or the like does not occur between the output shaft and the first gear. Therefore, a play between the output shaft and the first gear is set to be small, and the distal end of the output shaft easily interferes with an end of the first gear when the motor is attached.

In the present configuration, the tapered inclined portion is provided at the distal end of the output shaft to facilitate the attachment work of the motor. The inclined portion formed at the distal end of the output shaft is less likely to mesh with the first gear, which is a planetary gear. Therefore, the inclined portion passes through the first gear and protrudes to a side of the shaft support portion. Thus, by forming the recessed portion in a portion of the shaft support portion that faces the distal end of the output shaft and surrounding the inclined portion by the recessed portion, an influence of an increase in a length of the output shaft due to the formation of the inclined portion is absorbed without reducing a meshing length between the output shaft and the first gear, and the rotation support structure is kept compact.

As described above, according to the present configuration, it is possible to obtain the rotation support structure for an electric cylinder that appropriately outputs an output of the motor while simplifying configurations of the gear unit and the piston.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotation support structure for an electric cylinder, comprising:
   a cylindrical housing;
   a motor attached to the housing and including an output shaft; and
   a speed reduction mechanism built in the housing and connected to the output shaft, wherein
   the speed reduction mechanism includes:
      a gear unit including a first gear on one side that rotates in accordance with the output shaft, and a shaft support portion on the other side that rotates together with the first gear and has an outer member facing an inner surface of the housing and a ball mounted thereon; and
      an annular second gear fixed to the inner surface of the housing and meshing with the first gear,
   one side end portion of the outer member along an axis of the output shaft faces the inner surface of the housing or a spacer attached to the housing, and the other side end portion faces the second gear,
   a gap is formed between the outer member and the second gear, and between the outer member and at least either the housing or the spacer, and
   a gap is formed between the outer member and the inner surface of the housing.

2. The rotation support structure for an electric cylinder according to claim 1, wherein
   the gear unit and the second gear are inserted into the housing in order from an opening on one side of the housing, and
   the second gear is fixed to the housing by a flange portion protruding radially outward from an outer peripheral portion of the second gear.

3. The rotation support structure for an electric cylinder according to claim 2, wherein
   a portion of the inner surface of the housing that faces an outer surface of the outer member and an outer surface of the second gear is a cylindrical surface, and the outer surface of the outer member has an outer diameter smaller than an outer diameter of the outer surface of the second gear.

4. The rotation support structure for an electric cylinder according to claim 3, wherein
   a second output shaft is fitted and connected to an end of the gear unit, and a piston that is reciprocally moved along the axis while being in close contact with the inner surface of the housing is screwed to the second output shaft.

5. The rotation support structure for an electric cylinder according to claim 2, wherein
   a second output shaft is fitted and connected to an end of the gear unit, and a piston that is reciprocally moved along the axis while being in close contact with the inner surface of the housing is screwed to the second output shaft.

6. The rotation support structure for an electric cylinder according to claim 1, wherein
   a portion of the inner surface of the housing that faces an outer surface of the outer member and an outer surface of the second gear is a cylindrical surface, and the outer surface of the outer member has an outer diameter smaller than an outer diameter of the outer surface of the second gear.

7. The rotation support structure for an electric cylinder according to claim 6, wherein
   a second output shaft is fitted and connected to an end of the gear unit, and a piston that is reciprocally moved along the axis while being in close contact with the inner surface of the housing is screwed to the second output shaft.

8. The rotation support structure for an electric cylinder according to claim 1, wherein
a second output shaft is fitted and connected to an end of the gear unit, and a piston that is reciprocally moved along the axis while being in close contact with the inner surface of the housing is screwed to the second output shaft.

9. A rotation support structure for an electric cylinder, comprising:
a cylindrical housing;
a motor attached to the housing and including an output shaft; and
a speed reduction mechanism built in the housing and connected to the output shaft, wherein
the speed reduction mechanism includes:
a gear unit including a first gear on one side that rotates in accordance with the output shaft, and a shaft support portion on the other side that rotates together with the first gear and has an outer member facing an inner surface of the housing and a ball mounted thereon; and
an annular second gear fixed to the inner surface of the housing and meshing with the first gear, and
when viewed in a direction orthogonal to an axis of the output shaft, the second gear and the shaft support portion are disposed in a state of being spaced from each other in an extending direction of the axis, and when viewed in a direction along the axis, the outer member and the first gear are disposed in a state of being spaced from each other in a radial direction.

10. The rotation support structure for an electric cylinder according to claim 9, wherein
with respect to the shaft support portion and the outer member that face each other with the ball interposed therebetween, a length of the shaft support portion along the extending direction of the axis is shorter than a length of the outer member, and a side surface of the shaft support portion that faces the second gear is farther spaced from the second gear than a side surface of the outer member that faces the second gear.

11. The rotation support structure for an electric cylinder according to claim 10, wherein
the gear unit is a planetary gear mechanism, the first gear is a planetary gear, the shaft support portion is a carrier that supports a plurality of the planetary gears, and the output shaft is a sun gear,
a tapered inclined portion is provided at a distal end of the output shaft, and
a recessed portion that accommodates the inclined portion is provided at a position of the shaft support portion where the shaft support portion faces the output shaft.

12. The rotation support structure for an electric cylinder according to claim 9, wherein
the gear unit is a planetary gear mechanism, the first gear is a planetary gear, the shaft support portion is a carrier that supports a plurality of the planetary gears, and the output shaft is a sun gear,
a tapered inclined portion is provided at a distal end of the output shaft, and
a recessed portion that accommodates the inclined portion is provided at a position of the shaft support portion where the shaft support portion faces the output shaft.

* * * * *